US008223724B2

(12) United States Patent
Hakuli et al.

(10) Patent No.: US 8,223,724 B2
(45) Date of Patent: Jul. 17, 2012

(54) FRAME AND CHIP OFFSET FOR SRNC IN UE INVOLVED RELOCATION ON CARRIER SHARING

(75) Inventors: Tuomas Tapio Hakuli, Oulu (FI); Masatoshi Nakamata, Kanagawa (JP)

(73) Assignee: Nokia Siemens Networks Oy, Espoo (FI)

( * ) Notice: Subject to any disclaimer, the term of this patent is extended or adjusted under 35 U.S.C. 154(b) by 721 days.

(21) Appl. No.: 12/263,109

(22) Filed: Oct. 31, 2008

(65) Prior Publication Data

US 2009/0219896 A1    Sep. 3, 2009

Related U.S. Application Data

(60) Provisional application No. 60/984,682, filed on Nov. 1, 2007.

(51) Int. Cl.
*H04B 7/216* (2006.01)
*H04W 4/00* (2009.01)
*H04W 72/00* (2009.01)
*H04J 3/06* (2006.01)

(52) U.S. Cl. ........ 370/335; 370/320; 370/328; 370/342; 370/350; 455/450; 455/464

(58) Field of Classification Search .................. None
See application file for complete search history.

(56) References Cited

U.S. PATENT DOCUMENTS 6,892,071 B2 * 5/2005 Park et al. .......... 455/436
7,031,277 B2 * 4/2006 Choi et al. .......... 370/331
2001/0046218 A1 * 11/2001 Costa et al. ........ 370/331
2003/0031119 A1 * 2/2003 Kim et al. .......... 370/200
2005/0030958 A1   2/2005 Laiho et al.

OTHER PUBLICATIONS

3GPP TS 25.423 V7.6.0, "3rd Generation Partnership Project; Technical Specification Group Radio Access Network; UTRAN Iur interface RNSAP signalling (Release 7)", Sep. 2007, 848 pages.
Interdigital Comm. Corp., TSG-RAN Working Group 3 Meeting #6, TSGR3#6(99)905, "Synchronization of TDD Cells", Sophia Antipolis, France, Aug. 1999, 6 pages.
Nokia Siemens Networks, "Appendix a: I-HSPA with Iur based Carrier sharing", 2007, 4 pages.
Nokia Siemens Networks, Appendix B, R3-072287, "UE Involved Relocation with Timing Maintaining HHO", Nov. 5, 2007, 7 pages.

(Continued)

*Primary Examiner* — Anh-Vu H Ly
*Assistant Examiner* — Diane Lo
(74) *Attorney, Agent, or Firm* — Laurence A. Greenberg; Werner H. Stemer; Ralph E. Locher

(57) ABSTRACT

This invention is related to a system and method to setup a radio link in a CDMA mobile communication network. In particular, a radio network controller (RNC) sends a radio link setup request message, and a processing device receives the radio link setup request message. The processing device sends a radio link setup response message to the RNC, and the response is received the RNC and includes frame and chip offset information. In particular, frame and chip offset in a RNSAP Radio Link Setup Response message (after execution of UE involved relocation) is conveyed. A new SRNC will then include a random frame offset in the RNSAP Radio Link Setup Request message. The eHSPA Node B will ignore the random frame offset, and include the correct frame offset in the RNSAP Radio Link Setup Response message.

24 Claims, 6 Drawing Sheets

Signaling Flow for UE Involved Relocation

OTHER PUBLICATIONS

Nokia Siemens Networks, Appendix C, R3-072xxx, "Introduction of Frame Offset/Chip Offset into Radio Link Setup Response", 2007, 7 pages.

Nokia Siemens Networks, Appendix D, R2-074939, "UE Involved Relocation with Timing Maintaining HHO", 2007, 20 pages.

Nokia Siemens Networks, Appendix E, RP-070761, 2007, 2 pages.

Nokia Siemens Networks, Appendix F, 3GPP TR 25.999 V2.3.0, "Technical Specification Group Radio Access Network; HSPA Evolution (FDD); (Release 7)", 2007, 66 pages.

* cited by examiner

Fig. 2 – Evolved High Speed Packet Access (HSPA) Architecture

Figure 3 - Signaling Flow for UE Involved Relocation

Figure 4 – Signaling Flow for Alternate 1

FIG. 5 – Signaling for Alternate 2

FRAME AND CHIP OFFSET FOR SRNC IN UE INVOLVED RELOCATION ON CARRIER SHARING

BACKGROUND

UTRAN, short for UMTS (Universal Mobile Telecommunications System) Terrestrial Radio Access Network, is a collective term for the Base Stations and Radio Network Controllers (RNCs) which make up the UMTS radio access network. This communications network, commonly referred to as 3G (for 3rd Generation Wireless Mobile Communication Technology), can carry many traffic types from real-time Circuit Switched to IP based Packet Switched. The UTRAN allows connectivity between the User Equipment (UE) and the Core Network (CN). The UTRAN includes the base stations, which are called Node Bs, and Radio Network Controllers (RNCs). The RNC provides control functionalities for one or more Node Bs. A Node B and an RNC can be the same device (otherwise known as eHSPA NodeB), although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

In the UTRAN architecture, as depicted in FIG. 1, there are four interfaces connecting the UTRAN to other functional entities: Iu, Uu, Iub and Iur. The Iu interface is an interface that connects the RNC to the CN. The Uu interface connected the Node B with the UE. The Iub is an interface connects the RNC with the Node B. The Iur connects two RNCs with each other. It is understood that the functional entities, such as the RNC, Node B, etc, may be any device capable of processing the necessary functions, as readily understood by the skilled artisan.

UMTS is one of the third-generation (3G) cell phone technologies. Currently, the most common form uses W-CDMA as the underlying air interface, is standardized by the 3GPP, and is the European answer to the ITU IMT-2000 requirements for 3G cellular radio systems. UMTS, using W-CDMA, supports up to 14.0 Mbit/s data transfer rates in theory (with HSDPA), although at the moment users in deployed networks can expect a transfer rate of up to 384 kbit/s for R99 handsets, and 3.6 Mbit/s for HSDPA handsets in the downlink connection. This is still much greater than the 9.6 kbit/s of a single GSM error-corrected circuit switched data channel or multiple 9.6 kbit/s channels in HSCSD (14.4 kbit/s for CDMAOne), and—in competition to other network technologies such as CDMA2000, PHS or WLAN—offers access to the World Wide Web and other data services on mobile devices. Of course, 3GPP is continually improving HSPA technology, with MIMO and 64QAM, such that the peak rate is much larger.

Since 2006, UMTS networks in many countries have been or are in the process of being upgraded with High Speed Downlink Packet Access (HSDPA), sometimes known as 3.5G. Currently, HSDPA enables downlink transfer speeds of up to 7.2 Mbit/s. Work is also progressing on improving the uplink transfer speed with the High-Speed Uplink Packet Access (HSUPA).

In mobile telecommunication systems, the ability to allow subscribers to move within and outside networks is important. This requires a process known as Serving RNS (SRNS) relocation, in which an existing SRNS is replaced by a target RNS. When a UE moves out of a first RNS into a new RNS, a process known as Hard Handover (HHO), the service RNC (SRNC) of the SRNS is replaced by the target RNC of the second RNS. For example, the user place connection extends between the target RNC (i.e. drift RNC) and the CN via the SRNC, where the interface between the two is the Iur interface. The network may subsequently divide to convert the drift RNC (DRNC) into the SRNC, establishing a direct user plane connection to the CN.

The SRNS relocation process may be initiated, for example, by the SRNC sending to the CN a Relocation Required message. This message is defined in the Radio Access Network Application Part (RANAP) protocol and carried over the Iu interface. The CN responds to receipt of a Relocation Required message by sending a Relocation Request message to the target RNC. The Relocation Request message is also defined in the RANAP protocol.

The Relocation Request message contains the identities of the Radio Access Bearers (RABs) to be transferred. Both the Relocation Request message and the Relocation Required message contain an Radio Resource Control (RRC) container. This container is defined in the RRC protocol, and contains amongst other things the identities of the Radio Bearers (RBs) to be transferred as well as details of the mappings between the RBs and the lower layer attributes, i.e. to logical, transport, and physical channels. It is noted that the RB identities and the mappings between the RBs and the lower layer attributes are contained in a container which is passed transparently by the core network.

FIG. 2 illustrates an alternative architecture depicting an evolved HSPA architecture for a flat radio access architecture of an UTRAN network. In this architecture, the RNC functions are in Node B, and referred to as an evolved HSPA Node B. This architecture does not have an Iu-CS UP (interface toward CS-Service Domain) with the Mobile Switching Center (MSC) or with Media Gateway (MGW), and in the cell which both CS and PS service is operated under the Node B and when CS service is to be established (UE requests a CS RAB), the Node B+ needs to execute the SRNS Relocation for moving the Serving RNC's (SRNCs) functionality to the RNC which has an Iu-CS UP.

SUMMARY OF THE INVENTION

In one embodiment of the invention, there is a system to setup a radio link in a CDMA mobile communication network. The system includes, for example, a radio network controller sending a radio link setup request message; and a radio link setup message processing device receiving the radio link setup request message and sending a RL setup response message to the radio network controller, wherein the response is received by the radio network controller and includes frame and chip offset information.

In another embodiment of the invention, there is a method to setup a radio link in a CDMA mobile communication system. The method includes, for example, sending a radio link setup request message from a first radio link setup message processing device; and receiving the radio link setup request message at a second radio link setup message processing device, and sending a radio link setup response message from the second radio link setup message processing device to the first radio message setup message processing device, wherein the response message is received by the first radio link setup message processing device and includes frame and chip offset information.

In one aspect of the invention, the radio link setup request message includes a synchronization indicator.

In another aspect of the invention, the first radio link setup processing device or the second message processing device are implemented in base stations.

In another aspect of the invention, the first radio link setup processing device or the second radio link setup processing device are implemented in radio network controllers.

In still another aspect of the invention, if the radio link setup request message includes a D-RNTI which has a radio link and the synchronization indicator, the radio network controller ignores the information in the frame and chip offset in the radio link setup request message and includes frame and chip offset values used for established radio link in the radio link setup response message.

In yet another aspect of the invention, during a serving radio network subsystem relocation procedure, and prior to sending the radio link setup message, the first radio link setup processing device receives a relocation request from the core network, and the first radio link setup processing device sends a relocation request acknowledgement message to the network after receiving the radio link setup response message.

In another aspect of the invention, during a serving radio network subsystem relocation procedure, the second radio link setup processing device sends a relocation required information to the core network, and the second radio link setup processing device receives a relocation command from the core network.

In still another aspect of the invention, if the radio network controller receives an S-RNTI or D-RNTI which includes established radio links, and a synchronization indicator is not included in the radio link setup request message, the radio network controller sends an radio link setup failure message.

In yet another aspect of the invention, if the radio link setup request message includes a synchronization indicator for a radio link, but does not include a D-RNTI having the radio link, the radio network controller sends a radio link setup failure message.

In another embodiment of the invention, there is a radio network controller for setup a radio link, the radio network controller sending a radio link setup request message including a synchronization indicator, and receiving a radio link setup response message including frame and chip offset information.

In still another embodiment of the invention, there is a base station, including a radio link setup message processing device, the base station to a radio link setup request message including a synchronization indicator, and sending a radio link setup response message including frame and offset information.

In yet another embodiment of the invention, there is a computer readable medium storing a program executable by a computer to setup a radio link in a CDMA mobile communication system, comprising sending a radio link setup request message from a first radio link setup message processing device, and receiving a radio link setup response message from a second radio link setup message processing device, wherein the response message includes frame and chip offset information.

In still another embodiment of the invention, there is a computer readable medium storing a program executable by a computer to setup a radio link in a CDMA mobile communications system, comprising receiving a radio link setup request message from a first radio link setup message processing device, and sending a radio link setup response message from a second radio link setup message processing device, wherein the response message includes frame and chip offset information.

In another embodiment of the invention, there is an apparatus located in a radio link processing device to setup a radio link in a CDMA mobile communication system, the apparatus sending a radio link setup request message including a synchronization indicator, and receiving a radio link setup response message including frame and chip offset information.

In yet another embodiment of the invention, there is an apparatus located in a radio link processing device to setup a radio link in a CDMA mobile communication system, the apparatus receiving a radio link setup request message including a synchronization indicator, and sending a radio link setup response message including frame and offset information.

DETAILED DESCRIPTION

This invention is related to a system and method to setup a radio link in a CDMA mobile communication network. In particular, a RNC sends a radio link setup request message, and a processing device (for example, the RNC or base station) receives the radio link setup request message. The processing device sends a radio link setup response message to the RNC, and the response is received the RNC and includes frame and chip offset information. As explained above, the RNC functions can be performed in the RNC, in the base station or in a combination thereof.

Figure 1:
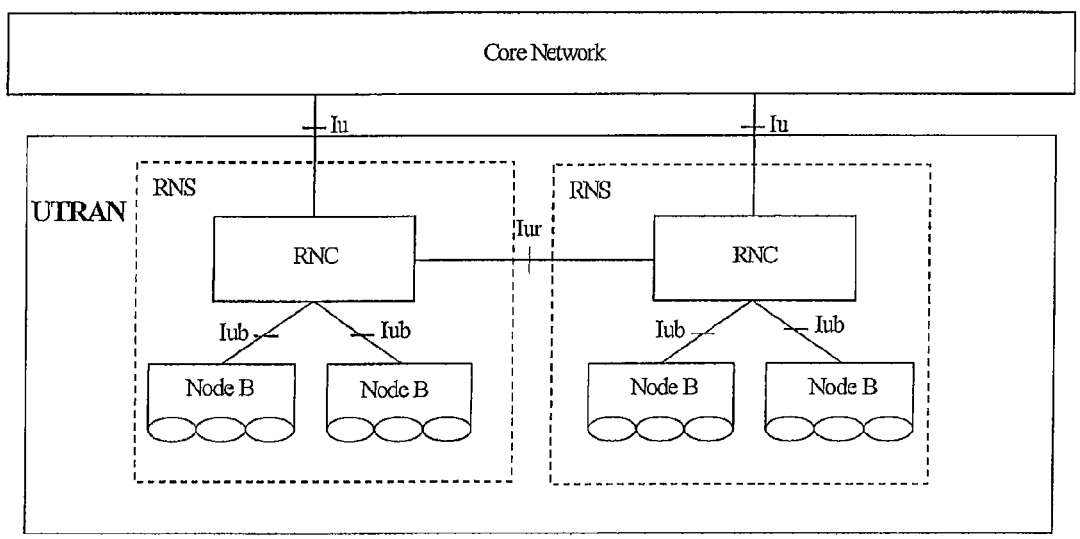
FIG. 1 illustrates a conventional UTRAN architecture.
Figure 2:
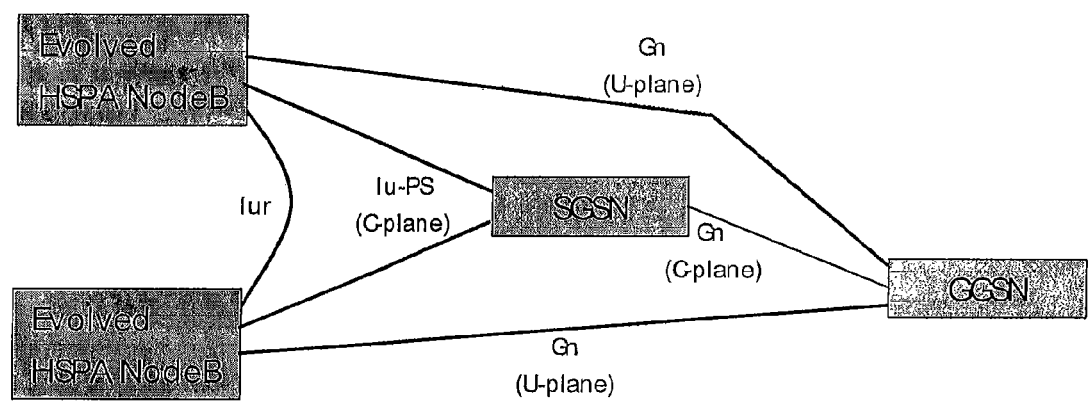
FIG. 2 illustrates an evolved high speed packet access (HSPA) architecture.
Figure 3:
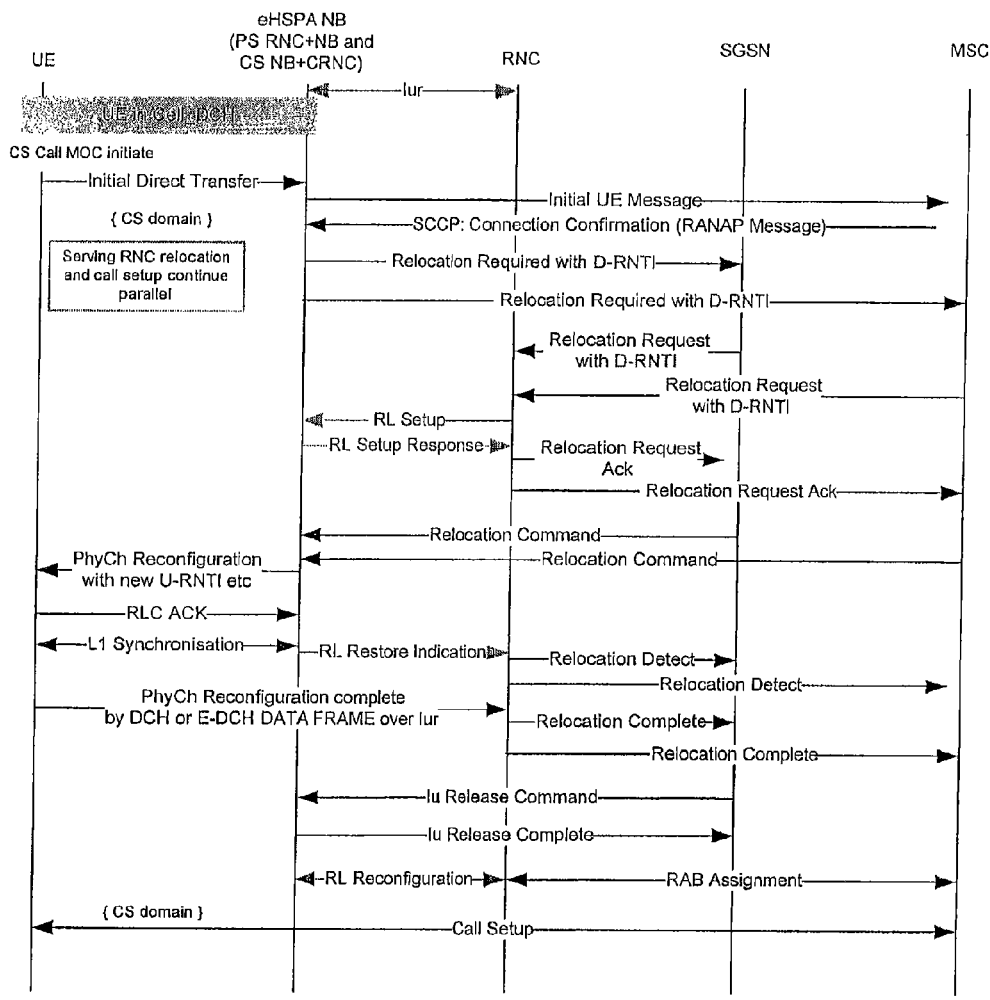
FIG. 3 illustrates an exemplary signaling flow for UE involved relocation.

UE Involved Relocation is used for the relocation and timing-maintaining (not re-initialized) HHO, and is executed with the relocation. Signalling flow UE involved relocation is described below with reference to FIG. 3. To enable this relocation, eHSPA Node B notices from the initial direct transfer that the UE is starting a CS call (or from establishment caused in an RRC connection request). Initial direct transfer triggers the establishment of a SCCP connection (connection request CR) towards the MSC. This SCCP CR message includes an "Initial_UE" Radio Access Network Application Part (RANAP) message. The MSC acknowledges the SCCP connection by sending the connection confirmation SCCP message.

The eHSPA Node B creates the UE context for the UE by allocating D-RNTI and sends the MSC and SGSN the relocation required with the D-RNTI. The legacy RNC receives a relocation request with the D-RNTI, and executes a RNSAP RL setup procedure by sending a RL setup request message with the D-RNTI, which identifies the UE in the DRNC/eHSPA Node B. The legacy RNC is allowed to set different parameter values from the received values in the RRC container in response to the RL setup request message. The Node B reserves the new RL resources based on the request.

After the reception of the relocation command which includes the RRC, the physical channel reconfiguration request informs the new U-RNTI and new physical channel parameters, etc. to the UE. The eHSPA Node B sends the UE the physical channel reconfiguration request, and if it does not receive a "failure" message from the UE, the eHSPA and UE execute intra-frequency HHO (using the new physical layer parameters in the received RL setup request) when the time in the activation time has elapsed. A RNSAP RL reconfiguration procedure for establishing the transport channel for CS RAB over the Iur is triggered after the reception of the RAB assignment request message establishes CS RAB.

In the process above, several problems exist with determining and maintaining the frame offset in UMTS networks. Frame Offset is the offset between the system frame number (SFN) and connection frame number (CFN) used in a cell. A SRNC decides the offset value for the first radio link (RL), and calculates one for RLs established after the first RL in order to allocate the same CFN value to, for example a DL Dedicated Channel (DCH) Data Frame, including the same data transmitted to all cells over the Iub (interface between RNC and Node B)/Iur (interface between two RNCs) by the SRNC, and UL DCH/E-DCH Data Frame including the same data transmitted from all cells/Node Bs to the SRNC by Node B.

Although the UE involved relocation is used for relocation, and timing maintaining (not re-initialized) HHO is executed with the relocation, there is a difference between timing-maintaining HHO and timing re-initialized HHO. The issue is which Node B (the logical nodes in the RNS responsible for radio transmission/reception to/from the UE) shall maintain timing, i.e. to keep using a Dedicated Packet Channel (DPCH) frame offset/chip offset which is offset between the beginning of a P-CCPCH frame and the beginning of a DPCH frame and frame offset, which are used before the HHO to the new RL.

During SRNS relocation, the RNC, which becomes the SRNC, does not know what Frame Offset was used in eHSPA Node B (eHSPA Node B=Node B with RNC functions). Since the eHSPA Node B continues to use the CFN offset for the RL after the relocation, which was determined before the relocation, the following problems are present:
  (a) Inaccurate mapping between CFN and RFN regardless of the DCH Synchronization procedure.
  (b) DCH Synchronization procedure is repeated multiple times, which also increases DCH synchronization time. On average, the first DCH Synchronization procedure includes CFN, which is 1.275 seconds off.
  (c) For an Enhanced-DCH (E-DCH), a new SRNC does not know, in relation to the RFN, when for example HARQ Failure occurs or the process has correctly decoded data.
  (d) In the event the UE moves to a cell under another Node B, by keeping the RL under the eHSPA Node B which executed the relocation, the SRNC can not calculate the correct Frame Offset to allocate the same CFN value to the Data Frame. Thus, for the UL, since the SRNC receives the E-DCH/DCH Data Frame with a different CFN for the same data, the MDC does not work. This is similar when the UL, UE receives the DL data with the same data at a different timing. In case the eHSPA Node B supports the DL DCH, similar problem, which Node Bs/cells in the active set may send DL data at different timing and soft combing gain can not be obtained by UE, exists.

In addition to Frame Offset, the target RNC does not know which DPCH frame offset/chip offset was used. Chip offset is defined as the radio timing offset inside a radio frame. The chip offset is used as an offset for the DL DPCH relative to the Primary Common Pilot Channel (CPICH) timing for the DL DPCH or for the F-DPCH. This lack of knowledge causes Node B to send data at different timings, which prevents the UE from executing soft combining. The resulting errors, in the worst case, require SRNC to release the RRC connection of the UE.

The timing-maintained HHO procedure removes the RL(s) in the active set and establishes a new RL(s), while maintaining the CFN in the UE. For Time-Division Duplexing (TDD), re-initialized HHO is realized via a CFN calculation. For Frequency-Division Duplexing (FDD) during the HHO procedure, the UE will align the timing of the uplink transmission. This procedure is only initiated if the UTRAN knows the target SFN timing before HHO. The target SFN timing can be known by the UTRAN in the following two cases:
  (a) UE reads SFN when measuring "Cell synchronization information" and sends it to the UTRAN in a measurement report message.
  (b) UTRAN internally knows the time difference between the cells.

During an initiation for FDD only, timing-maintained HHO is initiated by the network is normally performed by using the procedure "Physical channel reconfiguration", but may also be performed by using either one of the following procedures: "Radio bearer establishment"; "Radio bearer reconfiguration"; "Radio bearer release"; or "Transport channel reconfiguration." In the case of a timing maintained HHO procedure, the UTRAN should not include the IE "Default DPCH Offset Value." If the IE "Default DPCH Offset Value" is included, the UE shall ignore the IE "Default DPCH Offset Value."

In order to resolve some of the issues presented in the process described above, an alternative process introduces protocol support to enable a shared carrier solution (i.e. carrier sharing CS). A shared carrier solution means that the SRNC functionality for the UE's which have CS RAB (or additionally PS RAB) or only PS RAB are located in different entities. In a cell, when an UE having SRNC functionality is located in a Radio Access Network (RAN) node, which can not have Iu-CS user plane with MSC/MGW, i.e. eHSPA Node B, requests to establish CS RAB, SRNS relocation is executed to relocate the SRNC functionality to another RAN node which can establish an Iu-CS user plane with the MSC/MGW and the SRNC/RAN node controlling the cell which activates SRNS relocation becomes the DRNC after the relocation. In this instance, the UE involved relocation is applied, and Timing Maintaining HHO is executed.

Figure 4:
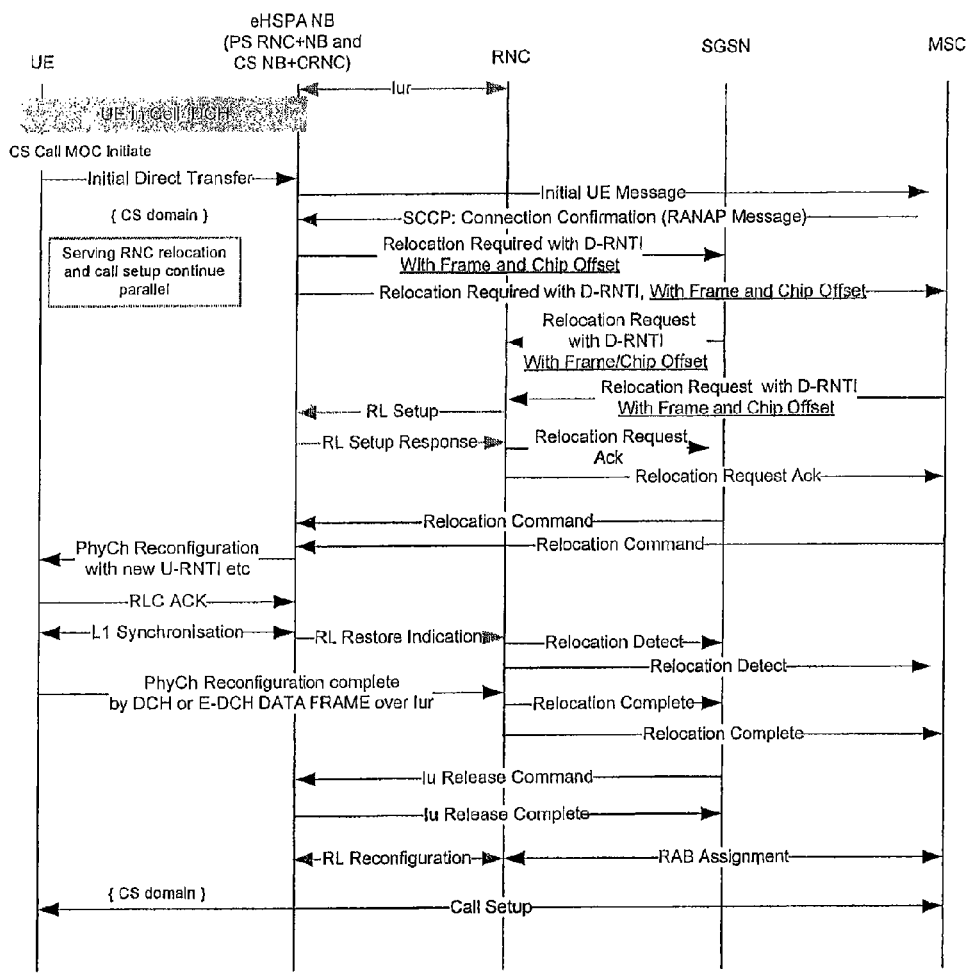
FIG. 4 illustrates another exemplary signaling flow for UE involved relocation.

In a first alternative, signaling is shown in FIG. 4. The chip offset and frame offset are signaled from a SRNC to a target RNC to enable the execution of the relocation with timing maintaining HHO, and how to signal the parameters to the target RNC. As shown in FIG. 4, parameters are signaled in the RRC container which are transmitted in the RANAP: Relocation Preparation from source RNC to CN and Relocation Request from CN to target RNC. Here, the target RNC includes the received offset value to one in the RNSAP: RL Setup Request message. However, frame offset/chip offset is not defined as an RRC or RANAP parameter. Rather, they are defined as a RNSAP/NBAP parameter such that a new transparent container in the RANAP message needs to be introduced for carrying the RNSAP parameters.

More specifically, the invention discloses forwarding frame offset and chip offset values (for the RL before the execution of the UE Involved Relocation) used in the eHSPA Node B to the RNC during the relocation by the RANAP message with RRC. These two parameters are not defined in the RRC specification, but rather in the Radio Network Subsystem Application Part (RNSAP)/Node B Application Part (NBAP) specification, such that a new transparent container needs to be introduced into a RANAP Relocation Preparation message and Relocation Request which are sent from the source RNC to the target RNC via the CN. If this signaling is used, the chip offset and frame offset should be included in the RNSAP container, not the RRC container included in the RANAP message.

Figure 5:
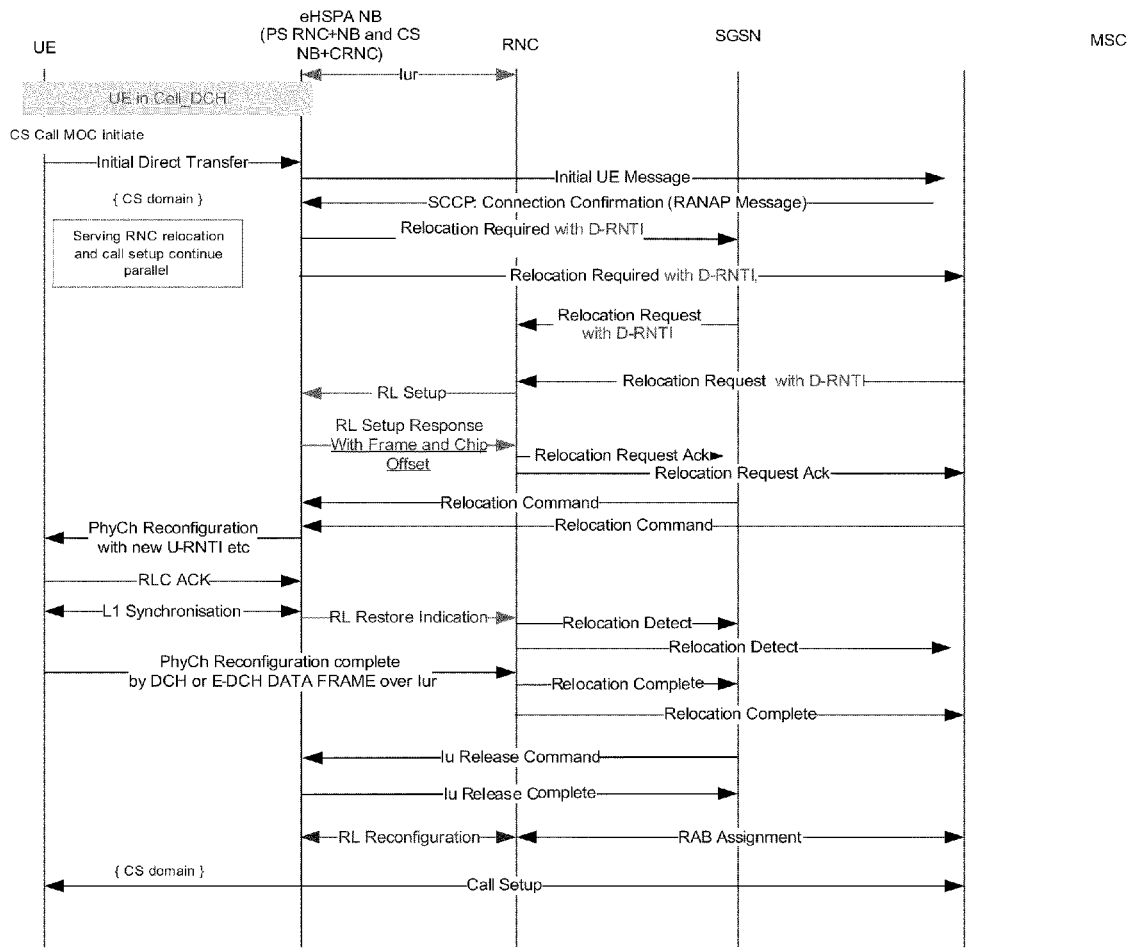
FIG. 5 illustrate another exemplary signaling flow for UE involved relocation.

In another alternative process, two parameters are used in the RNSAP RL Setup Response message, which is replied to in the RL Setup Request sent by target RNC during the relocation. That is, the old frame offset and chip offset are forwarded in a RNSAP Radio Link Setup Response message after execution of UE Involved Relocation. In this embodiment, relocation is executed as explained above, and a new SRNC will include a random frame offset in the RNSAP Radio Link Setup Request message, DRNC will ignore it, and will include a correct frame offset in the RNSAP Radio Link Setup Response message, as illustrated in FIG. 5.

The signaling flow for this embodiment is described with reference to FIG. 5. The target RNC receives a RANAP Relocation Request message with a D-RNTI for No Iu-CS UP IE. The target/SRNC sends source/DRNC a RNSAP: RL Setup Request message with the received D-RNTI, Synchronization Indicator and dummy chip and frame offset. The Source/DRNC knows to execute the timing-maintaining HHO from the received D-RNTI and Synchronization Indicator, and includes the chip and frame offset which is used for the cell in the RL Setup Response. The target/SRNC uses the received chip/frame offset for data transmission after the relocation and the calculation for the new RLs.

This embodiment introduces a frame offset and chip offset into an RL Setup Response. Since explicit signaling, which tells the DRNC/Node B+ that frame offset/chip offset in a RL Setup Request sent by the SRNC during the relocation are invalid, an indicator is added into the RL Setup Request. For example, a Synchronization Indicator is added into the RL Setup Request. The Synchronization Indicator IE indicates that timing maintained Synchronization shall be used at the start of a RL. An exemplary implementation follows.

| IE/Group Name | Presence | Range | IE Type and Reference | Semantics Description | | |
|---|---|---|---|---|---|---|
| Synchronization Indicator | | | ENUMERATED (Timing Maintained Synchronization, . . .) | | | |

| IE/Group Name | Presence | Range | IE Type and Reference | Semantics Description | Criticality | Assigned Criticality |
|---|---|---|---|---|---|---|
| Message Type | M | | 9.2.1.40 | | YES | reject |
| Transaction ID | M | | 9.2.1.59 | | — | |
| D-RNTI | O | | 9.2.1.24 | | YES | ignore |
| CN PS Domain Identifier | O | | 9.2.1.12 | | YES | ignore |
| CN CS Domain Identifier | O | | 9.2.1.11 | | YES | ignore |
| RL Information Responsif | | 1 . . . <maxnoofRLs> | | | EACH | ignore |
| >RL ID | M | | 9.2.1.49 | | — | |
| >RL Set ID | M | | 9.2.2.35 | | — | |
| >URA Information | O | | 9.2.1.70B | | — | |
| >SAI | M | | 9.2.1.52 | | — | |
| >Cell GAI | O | | 9.2.1.5A | | — | |
| >UTRAN Access Point Position | O | | 9.2.1.70A | | — | |
| >Received Total Wide Band Power | M | | 9.2.2.35A | | — | |
| >Not Used | O | | NULL | | — | |
| >DL Code Information | M | | FDD DL Code Information 9.2.2.14A | | — | |
| >CHOICE Diversity Indication | M | | | | — | |
| >>Combining | | | | | — | |
| >>>RL ID | M | | 9.2.1.49 | Reference RL ID for the combining | — | |
| >>>DCH Information Response | O | | 9.2.1.16A | | YES | ignore |
| >>>E-DCH FDD Information Response | O | | 9.2.2.4C | | YES | ignore |
| >>Non Combining or First RL | | | | | — | |
| >>>DCH Information Response | M | | 9.2.1.16A | | — | |
| >>>E-DCH FDD Information Response | O | | 9.2.2.4C | | YES | ignore |
| >SSDT Support Indicator | M | | 9.2.2.43 | | — | |
| >Maximum Uplink SIR | M | | Uplink SIR 9.2.1.69 | | — | |
| >Minimum Uplink SIR | M | | Uplink SIR 9.2.1.69 | | — | |
| >Closed Loop Timing Adjustment Mode | O | | 9.2.2.3A | | — | |

-continued

| | | | | | |
|---|---|---|---|---|---|
| >Maximum Allowed UL Tx Power | M | | 9.2.1.35 | — | |
| >Maximum DL TX Power | M | | DL Power 9.2.1.21A | — | |
| >Minimum DL TX Power | M | | DL Power 9.2.1.21A | — | |
| >Primary Scrambling Code | O | | 9.2.1.45 | — | |
| >UL UARFCN | O | | UARFCN 9.2.1.66 | Corresponds to Nu in ref. [6] | — |
| >DL UARFCN | O | | UARFCN 9.2.1.66 | Corresponds to Nd in ref. [6] | — |
| >Primary CPICH Power | M | | 9.2.1.44 | — | |
| >Not Used | O | | NULL | — | |
| >Neighbouring UMTS Cell Information | O | | 9.2.1.41A | — | |
| >Neighbouring GSM Cell Information | O | | 9.2.1.41C | — | |
| >PC Preamble | M | | 9.2.2.27a | — | |
| >SRB Delay | M | | 9.2.2.39A | — | |
| >Cell GA Additional Shapes | O | | 9.2.1.5B | YES | ignore |
| >DL Power Balancing Activation Indicator | O | | 9.2.2.10B | YES | ignore |
| >HCS Prio | O | | 9.2.1.30N | YES | ignore |
| >Primary CPICH Usage For Channel Estimation | O | | 9.2.2.32A | YES | ignore |
| >Secondary CPICH Information | O | | 9.2.2.38A | YES | ignore |
| >Active MBMS Bearer Service List | | 0 ... <maxnoofActiveMBMS> | | GLOBAL | ignore |
| >>TMGI | M | | 9.2.1.80 | — | |
| >>Transmission Mode | O | | 9.2.1.81 | — | |
| >>Preferred Frequency Layer | O | | UARFCN 9.2.1.66 | — | |
| >E-DCH RL Set ID | O | | RL Set ID 9.2.2.35 | YES | ignore |
| >E-DCH FDD DL Control Channel Information | O | | 9.2.2.4D | YES | ignore |
| >Initial DL DPCH Timing Adjustment | O | | DL DPCH Timing Adjustment 9.2.2.9A | YES | ignore |
| >F-DPCH Slot Format | O | | 9.2.2.85 | YES | ignore |
| >Frame Offset | O | | | | |
| >Chip Offset | O | | | | |
| Uplink SIR Target | | | Uplink SIR 9.2.1.69 | YES | ignore |
| Criticality Diagnostics | O | | 9.2.1.13 | YES | ignore |
| HS-DSCH-RNTI | O | | 9.2.1.30P | YES | ignore |
| HS-DSCH Information Response | O | | HS-DSCH FDD Information Response 9.2.2.19b | YES | ignore |
| Continuous Packet Connectivity HS-SCCH less Information Response | O | | 9.2.2.75 | YES | ignore |
| SixtyfourQAM DL Support Indicator | O | | 9.2.2.79 | YES | ignore |

| Range bound | Explanation |
|---|---|
| maxnoofRLs | Maximum number of RLs for one UE. |
| maxnoofActiveMBMS | Maximum number of MBMS bearer services that are active in parallel. |

Figure 6:
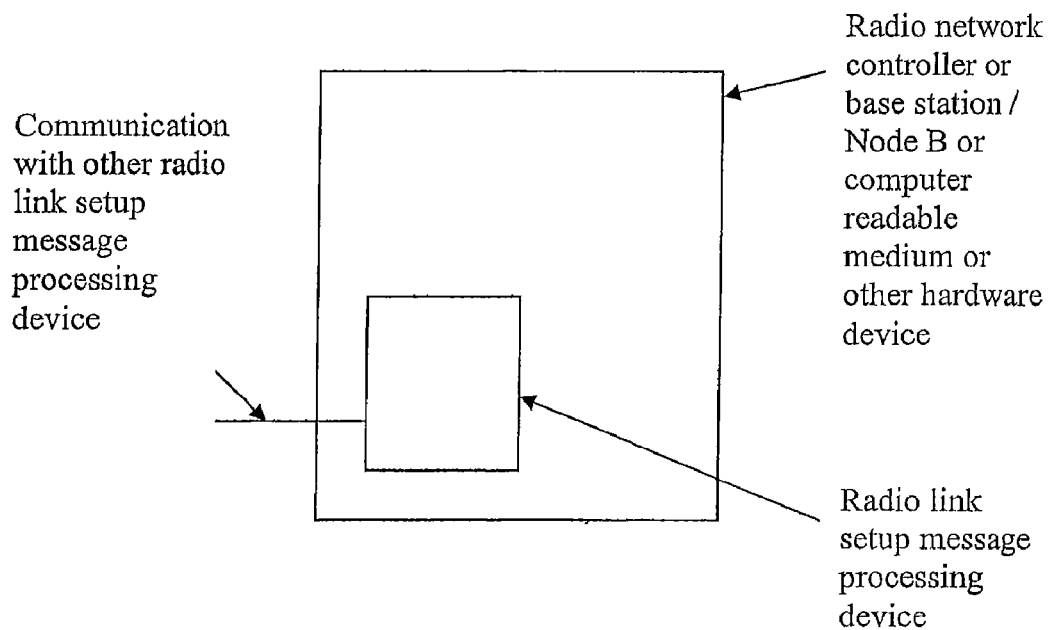
FIG. 6 illustrates an exemplary structure for the RNC and Node B.

Several advantages in using this embodiment include: resolving the issues with respect to frame offset as described above, utilizing the existing current message and parameters. In the first described alternative, the two parameters are signalled in one RANAP message, whereas in this second alternative architecture, they are transmitted in RNSAP messages FIG. 6 illustrates an exemplary structure for the RNC and Node B. As illustrated, a radio link setup message processing device processes communications with other radio link setup message processing devices located in other RNCs or Node Bs. It is appreciated that the RNC and Node B may be in form of hardware, software or any combination thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system to setup a radio link in a CDMA mobile communication system, comprising: a first radio link setup message processing device sending a radio link setup request message; and a second radio link setup message processing device receiving the radio link setup request message and sending a radio link setup response message to the first radio link setup message processing device, wherein the response is received by the first radio link setup message processing device and includes frame and chip offset information, wherein the radio link setup request message includes a synchronization indicator, and wherein if the radio link setup request message includes a D-RNTI which has a radio link and the synchronization indicator, the second radio link setup message processing device ignores the information in the frame and chip offset in the radio link setup request message and includes frame and chip offset values used for established radio link in the radio link setup response message.

2. A method to setup a radio link in a CDMA mobile communication system, comprising: sending a radio link setup request message from a first radio link setup message processing device; and receiving the radio link setup request message at a second radio link setup message processing device, and sending a radio link setup response message from the second radio link setup message processing device to the first radio link setup message processing device, wherein the radio link setup response message is received by the first radio link setup message processing device and includes frame and chip offset information, wherein the radio link setup request message includes a synchronization indicator, and wherein if the radio link setup request message includes a D-RNTI which has a radio link and the synchronization indicator, the second radio link setup message processing device ignores the information in the frame and chip offset in the radio link setup request message and includes frame and chip offset values used for established radio link in the radio link setup response message.

3. The method according to claim 2, wherein the first radio link setup message processing device or the second message processing device are implemented in base stations.

4. The method according to claim 2, wherein the first radio link setup message processing device or the second radio link setup message processing device are implemented in radio network controllers.

5. The method according to claim 2, wherein during a serving radio network subsystem relocation procedure, and prior to sending the radio link setup message, the first radio link setup message processing device receives a relocation request from a core network, and the first radio message processing device sends a relocation request acknowledgement message to the core network after receiving the radio link setup response message.

6. The method according to claim 2, wherein during a serving radio network subsystem relocation procedure, the second radio link setup message processing device sends a relocation required information to the core network, and the second radio link setup message processing device receives a relocation command from the core network.

7. The method according to claim 2, wherein if the radio network controller receives an S-RNTI or D-RNTI which includes established radio links, and a synchronization indicator is not included in the radio link setup request message, the radio network controller sends an radio link setup failure message.

8. The method according to claim 2, wherein if the radio link setup request message includes a synchronization indicator for a radio link, but does not include a D-RNTI having the radio link, the radio network controller sends a radio link setup failure message.

9. A radio network controller comprising a radio link setup message processing device, the radio link setup message processing device sending a radio link setup request message including a synchronization indicator, and receiving a radio link setup response message including frame and chip offset information, wherein the radio link setup request message includes a synchronization indicator, and wherein if the radio link setup request message includes a D-RNTI which has a radio link and the synchronization indicator, a second radio link setup message processing device ignores the information in the frame and chip offset in the radio link setup request message and includes frame and chip offset values used for established radio link in the radio link setup response message.

10. A base station, comprising a radio link setup message processing device, the radio link setup message processing device receiving a radio link setup request message including a synchronization indicator, and sending a radio link setup response message including frame and offset information, wherein the radio link setup request message includes a synchronization indicator, and wherein if the radio link setup request message includes a D-RNTI which has a radio link and the synchronization indicator, a second radio link setup message processing device ignores the information in the frame and chip offset in the radio link setup request message and includes frame and chip offset values used for established radio link in the radio link setup response message.

11. A non-transitory computer readable medium storing a program executable by a computer to setup a radio link in a CDMA mobile communication system, comprising sending a radio link setup request message from a first radio link setup message processing device, and receiving a radio link setup response message from a second radio link setup message processing device, wherein the response message includes frame and chip offset information, wherein the radio link setup request message includes a synchronization indicator, and wherein if the radio link setup request message includes a D-RNTI which has a radio link and the synchronization indicator, a second radio link setup message processing device ignores the information in the frame and chip offset in the radio link setup request message and includes frame and chip offset values used for established radio link in the radio link setup response message.

12. The non-transitory computer readable medium according to claim 11, wherein the first radio message processing device or the second message processing device are implemented in base stations.

13. The non-transitory computer readable medium according to claim 11, wherein the first radio link setup message processing device or the second radio link setup message processing device are implemented in radio network controllers.

14. The non-transitory computer readable medium according to claim 11, wherein during a serving radio network subsystem relocation procedure, and prior to sending the radio link setup message, the first radio link setup message processing device receives a relocation request from the core network, and the first radio link setup message processing device sends a relocation request acknowledgement message to the network after receiving the radio link setup response message.

15. The non-transitory computer readable medium according to claim 11, wherein during a serving radio network subsystem relocation procedure, the second radio link setup message processing device sends a relocation required information to the core network, and the second radio link setup message processing device receives a relocation command from the core network.

16. A non-transitory computer readable medium storing a program executable by a computer to setup a radio link in a CDMA mobile communications system, comprising receiving a radio link setup request message from a first radio link setup message processing device, and sending a radio link setup response message from a second radio link setup message processing device, wherein the response message includes frame and chip offset information, wherein the radio link setup request message includes a synchronization indicator, and wherein if the radio link setup request message includes a D-RNTI which has a radio link and the synchronization indicator, the second radio link setup message processing device ignores the information in the frame and chip offset in the radio link setup request message and includes frame and chip offset values used for established radio link in the radio link setup response message.

17. The non-transitory computer readable medium according to claim 16, wherein the first radio message processing device or the second message processing device are implemented in base stations.

18. The non-transitory computer readable medium according to claim 16, wherein the first radio link setup message processing device or the second radio link setup message processing device are implemented in radio network controllers.

19. The non-transitory computer readable medium according to claim 16, wherein during a serving radio network subsystem relocation procedure, and prior to sending the radio link setup message, the first radio link setup message processing device receives a relocation request from the core network, and the first radio link setup message processing device sends a relocation request acknowledgement message to the network after receiving the radio link setup response message.

20. The non-transitory computer readable medium according to claim 16, wherein during a serving radio network subsystem relocation procedure, the second radio link setup message processing device sends a relocation required information to the core network, and the second radio link setup message processing device receives a relocation command from the core network.

21. A device located in a radio link processing device to setup a radio link in a CDMA mobile communication system, the device including:
an apparatus adapted to send a radio link setup request message including a synchronization indicator, and adapted to receive a radio link setup response message including frame and chip offset information, wherein the radio link setup request message includes a synchronization indicator, and wherein if the radio link setup request message includes a D-RNTI which has a radio link and the synchronization indicator, the second radio link setup message processing device ignores the information in the frame and chip offset in the radio link setup request message and includes frame and chip offset values used for established radio link in the radio link setup response message.

22. The device of claim 21, wherein the radio link processing device is one of a radio network controller or base station.

23. A device located in a radio link processing device to setup a radio link in a CDMA mobile communication system, device including:
an apparatus adapted to send a radio link setup request message including a synchronization indicator, and adapted to send a radio link setup response message including frame and offset information, wherein the radio link setup request message includes a synchronization indicator, and wherein if the radio link setup request message includes a D-RNTI which has a radio link and the synchronization indicator, the second radio link setup message processing device ignores the information in the frame and chip offset in the radio link setup request message and includes frame and chip offset values used for established radio link in the radio link setup response message.

24. The device of claim 23, wherein the radio link processing device is one of a radio network controller or base station.

* * * * *